United States Patent
Gauss

(10) Patent No.: US 9,291,292 B2
(45) Date of Patent: Mar. 22, 2016

(54) KEYED COUPLING ASSEMBLY AND KIT

(75) Inventor: Jason C. Gauss, Jackson, MI (US)

(73) Assignee: EATON CORPORATION, Cleveland, OH (US)

( * ) Notice: Subject to any disclaimer, the term of this patent is extended or adjusted under 35 U.S.C. 154(b) by 1630 days.

(21) Appl. No.: 11/681,624

(22) Filed: Mar. 2, 2007

(65) Prior Publication Data

US 2008/0012333 A1     Jan. 17, 2008

Related U.S. Application Data

(60) Provisional application No. 60/778,228, filed on Mar. 2, 2006.

(51) Int. Cl.
*F16L 23/00* (2006.01)
*F16L 21/00* (2006.01)

(52) U.S. Cl.
CPC .............. *F16L 23/003* (2013.01); *F16L 21/00* (2013.01); *F16L 2201/10* (2013.01)

(58) Field of Classification Search
USPC .............. 285/65, 78, 145.1, 145.4, 325, 330, 285/913, 914, 27
See application file for complete search history.

(56) References Cited

U.S. PATENT DOCUMENTS

| | | | | |
|---|---|---|---|---|
| 1,031,587 A | * | 7/1912 | Reisik | 285/330 |
| 1,137,686 A | * | 4/1915 | Woelffel | 285/78 |
| 1,461,958 A | * | 7/1923 | Arnold | 285/305 |
| 3,287,031 A | * | 11/1966 | Simmons et al. | 285/27 |
| 4,111,514 A | * | 9/1978 | Brishka et al. | 439/680 |
| 4,416,305 A | | 11/1983 | Commette et al. | |
| 5,215,222 A | | 6/1993 | McGill | |
| 5,284,368 A | * | 2/1994 | Oetiker et al. | 285/81 |
| 5,333,915 A | * | 8/1994 | Sparling et al. | 285/73 |
| 5,383,689 A | * | 1/1995 | Wolfe, Sr. | 285/124.3 |

FOREIGN PATENT DOCUMENTS

| CA | 1277691 | 12/1990 |
|---|---|---|
| CA | 2153980 | 7/1994 |

OTHER PUBLICATIONS

Office Action in corresponding CA Application No. 2,580,326; Feb. 22, 2010.

* cited by examiner

*Primary Examiner* — Daniel P Stodola
*Assistant Examiner* — Zachary Dragicevich
(74) *Attorney, Agent, or Firm* — Squire Patton Boggs (US) LLP

(57) ABSTRACT

A keyed coupling assembly and kit for use with a coupling having a pair of connectable coupling members. The keyed coupling assembly includes a keyed member associated with each coupling member to permit the coupling members to mate with each other when the keyed members match, yet prevent the unwanted mating of the coupling members with each other when the keyed members do not match. The keyed coupling assembly is capable of ensuring that a fluid connection can only be made between matching keyed components, thereby ensuring that the characteristics of the fluid (e.g., type of fluid, fluid pressure, and/or fluid direction) delivered from one coupling member to the other is proper.

9 Claims, 8 Drawing Sheets

KEYED COUPLING ASSEMBLY AND KIT

CROSS-REFERENCE TO RELATED APPLICATION

This application claims priority to U.S. Provisional Application No. 60/778,228 filed on Mar. 2, 2006, the disclosure of which is hereby incorporated by reference in its entirety herein.

FIELD OF THE INVENTION

The present application relates to fluid couplings and, more particularly, to keyed fluid couplings.

BACKGROUND

Fluid couplings are used in a variety of industries and for a variety of applications. One type of fluid coupling includes a male coupling member and a female coupling member configured to mate with the male coupling member to form a quick disconnect coupling. Oftentimes, a device uses the same or at least very similar couplings for economic and manufacturing reasons. However, the similarities between couplings can cause a common manufacturing or field installation error of mistakenly connecting wrong coupling members together. At the least, this type of misconnection causes frustration and delay, and may also result in damage to the device of which the couplings are a part.

SUMMARY

In one embodiment, a keyed coupling assembly is provided. The keyed coupling assembly includes first and second coupling members configured to be connected to each other, a first keyed member associated with the first coupling member, and a second keyed member associated with the second coupling member. The second keyed member is configured to mate with the first keyed member when the first and second keyed members are rotationally aligned with each other. For example, the first keyed member includes at least one male element and the second keyed member includes at least one female element configured to receive the male element of the first keyed member. Upon rotational alignment of the first and second keyed members and subsequent axial movement of the first coupling member towards the second coupling member, the first keyed member mates with the second keyed member. This permits the first coupling member to be connected to the second coupling member upon further axial movement of the first coupling member towards the second coupling member.

In another embodiment, a keyed coupling kit for use with a coupling that includes connectable first and second coupling members is provided. The keyed coupling kit includes a first keyed member having an opening configured to receive the first coupling member and a second keyed member having an opening configured to receive the second coupling member. The second keyed member is configured to mate with the first keyed member when the first and second keyed members are rotationally aligned with each other. For example, the first keyed member includes at least one male element and the second keyed member includes at least one female element configured to mate with the male element of the first keyed member. Upon installation of the first and second keyed members onto the first and second coupling members, respectively, rotational alignment of the first and second keyed members, and subsequent axial movement of the first coupling member towards the second coupling member, the first keyed member receives the second keyed member. This permits the first coupling member to be connected to the second coupling member upon further axial movement of the first coupling member towards the second coupling member.

In another embodiment, a keyed coupling kit for use with a coupling that includes connectable first and second coupling members is provided. In this embodiment, the first coupling member has a keyed component associated therewith. The keyed coupling kit includes a complementary keyed member having an opening configured to receive the second coupling member, where the complementary keyed member is configured to mate with the keyed member associated with the first coupling member. For example, the complementary keyed member includes at least one male element and the keyed member associated with the first coupling member includes at least one female element configured to mate with the male element of the first keyed member. Upon installation of the complementary keyed member onto the second coupling member, rotational alignment of the complementary keyed member and the keyed member, and subsequent axial movement of the first coupling member towards the second coupling member, the keyed member mates with the complementary keyed member. This permits the first coupling member to be connected to the second coupling member upon further axial movement of the first coupling member towards the second coupling member.

BRIEF DESCRIPTION OF THE DRAWINGS

It will be appreciated that the illustrated boundaries of components in the figures represent one example of the boundaries. One of ordinary skill in the art will appreciate that one component may be designed as multiple components or that multiple components may be designed as one component. A component shown as an internal feature of another component may be implemented as an external feature and vice versa.

Further, in the accompanying drawings and description that follow, like parts are indicated throughout the drawings and description with the same reference numerals, respectively. The figures are not drawn to scale and the proportions of certain parts have been exaggerated for convenience of illustration.

DETAILED DESCRIPTION

Figure 1A:
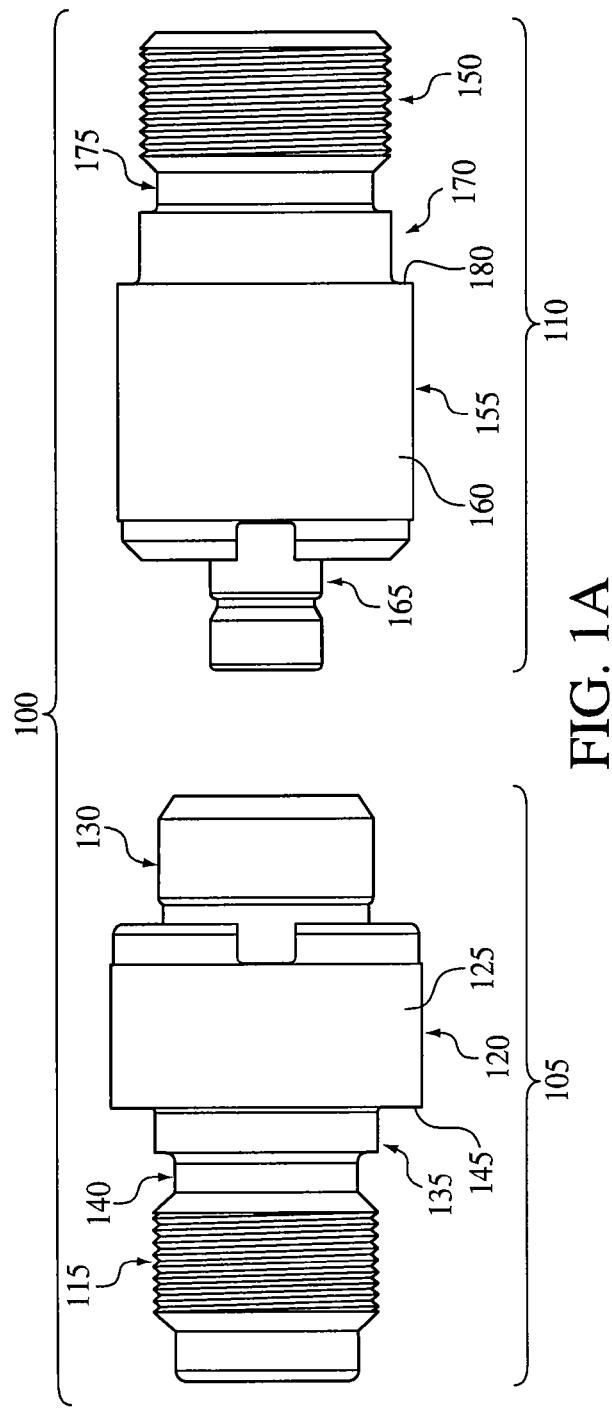
FIG. 1A illustrates a top view of one example of a fluid coupling 100 in an uncoupled position.

Certain terminology will be used in the foregoing description for convenience in reference only and will not be limiting. The terms "forward" and "rearward" with respect to each component of the coupling assembly will refer to direction towards and away from, respectively, the coupling direction. The terms "rightward" and "leftward" will refer to directions in the drawings in connection with which the terminology is used. The terms "inwardly" and "outwardly" will refer to directions toward and away from, respectively, the geometric centerline of the coupling assembly. The terms "upward" and "downward" will refer to directions as taken in the drawings in connection with which the terminology is used. All foregoing terms mentioned above include the normal derivative and equivalents thereof.

The present application is directed to a keyed coupling assembly for use with a coupling having a pair of mating coupling members. The keyed coupling assembly includes a keyed component associated with each coupling member to permit the coupling members to mate with each other when the keyed components match, yet prevent the unwanted mating of the coupling members with each other when the keyed components do not match. This keyed coupling assembly is capable of ensuring that a fluid connection can only be made between matching keyed components, thereby ensuring that the characteristics of the fluid (e.g., type of fluid, fluid pressure, and/or fluid direction) delivered from one coupling member to the other is proper.

The keyed coupling assembly is applicable to all types of fluid couplings including, without limitation, latchless-probe style, push-pull style, and thread-together style. Additionally, the keyed coupling assembly is applicable to fluid couplings that come in a variety of sizes, take the form of a variety of configurations, and are constructed from a variety of materials including, without limitation, stainless steel, aluminum, brass, and titanium.

Figure 1B:
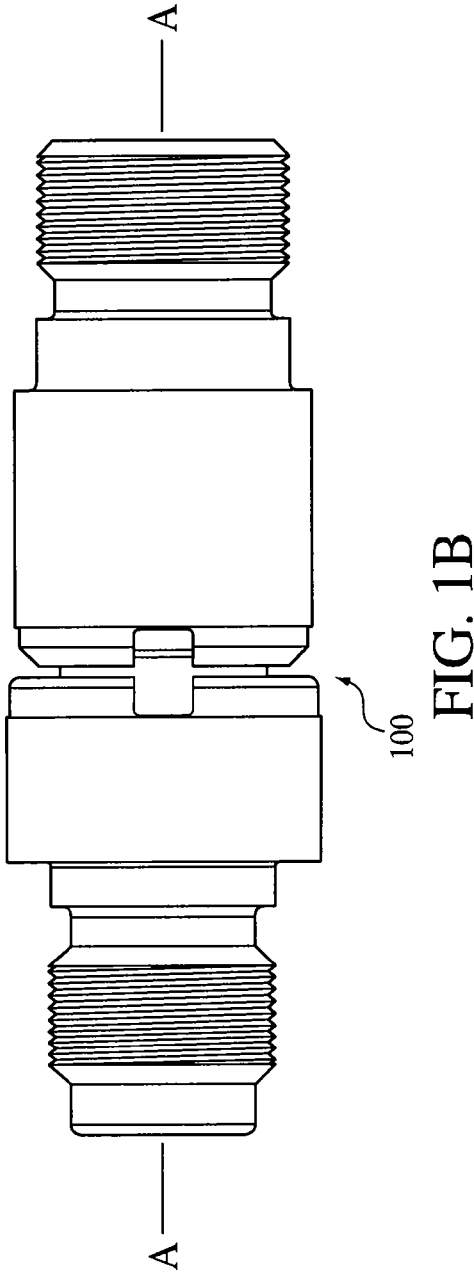
FIG. 1B illustrates a top view of the coupling 100 in the coupled position.

Illustrated in FIGS. 1A and 1B are cross-sectional views of one example of a fluid coupling 100 that can be used in the keyed coupling assembly. For purposes of this application, the keyed coupling assemblies described herein will be discussed with reference to the exemplary coupling 100; however, as discussed above, the keyed coupling assemblies are applicable to any type of coupling. FIG. 1A shows the coupling 100 in the uncoupled position, while FIG. 1B shows the coupling 100 in the coupled position. The coupling 100 includes a first coupling member 105 and a second coupling member 110 that, together, operate as a latchless-probe style coupling. The first coupling member 105 generally functions as the "female" member of the coupling 100 and the second coupling member 110 generally functions as the "male" member of the coupling 100, such that the first coupling member 105 is configured to receive the second coupling member 110. Both the first and second coupling members 105, 110 share the same central longitudinal axis A when they are in the coupled position as shown in FIG. 1B. One specific example of a quick disconnect fluid coupling that can be used in the keyed coupling assembly is a Blind-Mate Quick Disconnect Coupling (P/N AE75748 and P/N AE75747) manufactured by Eaton Corporation for use in electronic liquid cooling applications, which is described in detail in U.S. Pat. No. 5,215,222, the disclosure of which is incorporated by reference herein in its entirety.

As shown in FIG. 1A, the first coupling member 105 has a male threaded portion 115, an intermediate portion 120 having an outer surface 125, and a female connection portion 130. Between the intermediate portion 120 and the male threaded portion 115 are a first reduced diameter portion 135 capable of receiving a keyed component (not shown), which will be discussed in further detail below, and a second reduced diameter portion 140 configured to receive an O-ring (not shown). The transition between the first reduced diameter portion 135 and the intermediate portion 120 defines a shoulder 145.

With continued reference to FIG. 1A, the second coupling member 110 has a male threaded portion 150, an intermediate portion 155 having an outer surface 160, and a male connection portion 165. Between the intermediate portion 155 and the male threaded portion 150 are a first reduced diameter portion 170 capable of receiving a keyed component (not shown), which will be discussed in further detail below, and a second reduced diameter portion 175 configured to receive an O-ring (not shown). The transition between the first reduced diameter portion 170 and the intermediate annular portion 155 defines a shoulder 180. The male connection portion 165 is configured to connect to the female connection portion 130 of the first coupling member 105 to provide a fluid tight connection therebetween that is capable of being quickly disconnected.

Figure 2:
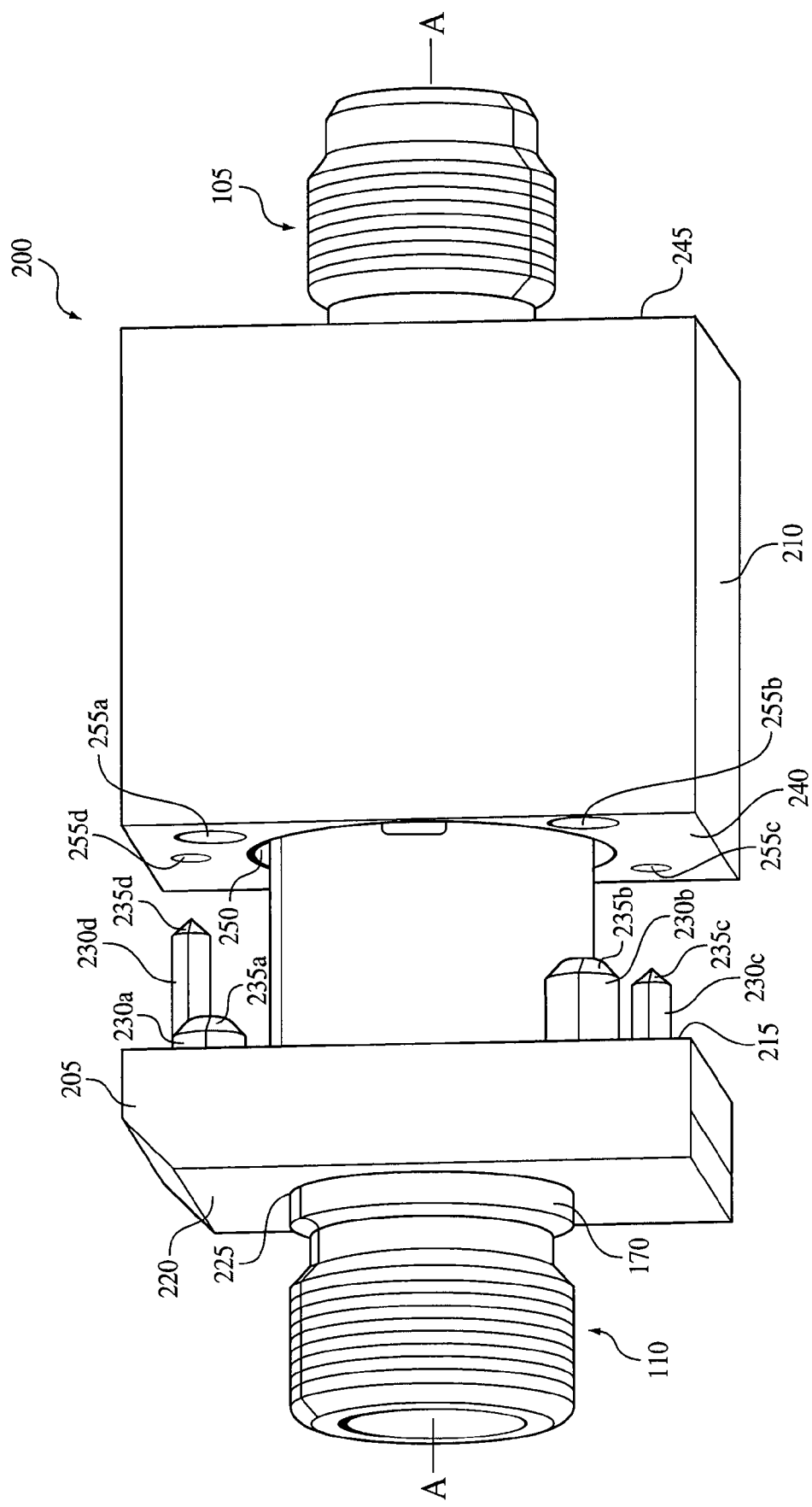
FIG. 2 illustrates a perspective view of one embodiment of a keyed coupling assembly 200 including the exemplary coupling 100.

Illustrated in FIG. 2 is a perspective view of one embodiment of a keyed coupling assembly 200 including the exemplary coupling 100 discussed above and illustrated in FIGS. 1A and 1B. In this embodiment, the keyed coupling assembly 200 includes a first keyed member or component 205 associated with the second coupling member 110 and a second keyed member or component 210 associated with the first coupling member 105, wherein the first and second keyed members 205, 210 are configured to mate with each other when they are properly aligned (rotationally) and axially moved towards each other.

With reference to FIG. 2, the first keyed member 205 includes first and second opposing surfaces 215, 220 that extend in a direction substantially perpendicular to the longitudinal axis A of the coupling 100 (hereinafter "first radial surface 215" and "second radial surface 220") and an opening 225 extending therebetween. The opening 225 is coaxial with the second coupling member 110 and sized to slidably receive the first reduced diameter portion 170 of the second coupling member 110 until the inner surface (not shown) of the wall of the first keyed member 205 that defines the first radial surface 215 seats against the shoulder 180 (not shown in FIG. 2) of the second coupling member 110.

The first keyed member 205 includes at least one male element that is configured to mate with at least one female element provided in or on the second keyed member 210, which will be described in further detail below, when such male and female elements are rotationally aligned (angularly oriented) with each other. In the illustrated embodiment, the first keyed member 205 includes four posts or pins 230a-d extending axially forward from the first radial surface 215. In alternative embodiments (not shown), the first keyed member 205 can include three or less posts or five or more posts extending axially forward from the first radial surface depending on the desired design. Additionally, in alternative embodiments (not shown), one or more of the posts 230a-d can be replaced with a projection or protrusion that extends axially forward from the first radial surface 215, such as a hemispherical bump. Moreover, in alternative embodiments (not shown), the first keyed member 205 can include at least one female-type feature or structure that is configured to mate with at least one male-type feature or structure provided in or on the second keyed member 210.

As shown in FIG. 2, the posts 230a-d are spaced-apart from each other and arranged in a predetermined pattern along the first radial surface 215 of the first keyed member 205. In alternative embodiments (not shown), the posts 230a-d can be arranged in a variety of different patterns along the first radial surface 215 of the first keyed member 205.

In the illustrated embodiment, the posts 230a-d are cylindrical in shape and have a circular cross-section. In alternative embodiments (not shown), one or more of the posts 230a-d can have a cross-section other than circular, such as triangular, square, rectangular, or another polygonal shape. As shown in FIG. 2, the posts 230a-d include tapered end portions 235a-d, respectively, that are configured to facilitate insertion of each post into a corresponding hole or opening provided in the second keyed member 210, which will be discussed in further detail below.

As shown in FIG. 2, the four posts 230a-d have different diameters and lengths. Specifically, the first post 230a has the same diameter as the second post 230b, but the first post 230a has a shorter length than the second post 230b. Similarly, the third post 230c has the same diameter as the fourth post 230d, but the third post 230c has a shorter length than the fourth post 230d. In alternative embodiments (not shown), the posts can all have the same length or they can all have different lengths. Moreover, in alternative embodiments (not shown), the posts can all have the same diameter or they can all have different diameters.

With continued reference to FIG. 2, the second keyed member 210 includes first and second opposing surfaces 240, 245 that extend in a direction substantially perpendicular to the longitudinal axis A of the coupling 100 (hereinafter "first radial surface 240 and second radial surface 245") and an opening 250 extending therebetween. The opening 250 is coaxial with the first coupling member 105 and is sized to slidably receive the first reduced diameter portion 135 of the first coupling member 105 until the inner surface (not shown) of the wall defining the second radial surface 245 of the second keyed member 210 seats against the shoulder 145 (not shown in FIG. 2) of the first coupling member 105.

As discussed above, the second keyed member 210 includes at least one female element that is configured to mate with at least one male element provided in or on the first keyed member 205, when such male and female elements are rotationally aligned (angularly oriented) with each other. In the illustrated embodiment, the second keyed member 210 includes four holes or bores 255a-d extending axially rearward from the first radial surface 240 and configured to receive the posts 230a-d, respectively, of the first keyed member 205. As shown in FIG. 2, the bores 255a-d are spaced-apart from each other and arranged in substantially the same predetermined pattern as the posts 230a-d of the first keyed member 205. Additionally, each bore 255a-d has a size (e.g., diameter and depth) and cross-sectional shape that generally correspond to the size and shape of the respective post 230a-d of the first keyed member 205. Also, in alternative embodiments (not shown), one or more of the bores 255a-d can be replaced with a groove or slot in the second keyed member 210. Moreover, in alternative embodiments (not shown), the second keyed member 210 can include at least one male-type feature or structure that is configured to mate with at least one female-type feature or structure provided in or on the first keyed member 205.

Although it is preferable that the bores 255a-d generally correspond in size and shape to the posts 230a-d, respectively, it will be appreciated that the holes need only be sufficiently dimensioned to receive the posts and not necessarily have the same cross-sectional shape as the posts. For example, if a post is cylindrical shaped and has a circular cross-section as shown in FIG. 2, it is preferable that the mating hole is cylindrical shaped and sized appropriately to receive the post. However, it is possible to provide a hole having a square-shaped cross-section so long as the hole dimensions are capable of receiving the post.

Upon rotational alignment of the male elements (i.e., the posts 230a-d) to the female elements (i.e., the bores 255a-d), the first and second keyed members 205, 210 are permitted to mate with each other and move in an axial direction towards each other. Once in a mating relationship with each other, the first and second coupling members 105, 110 are permitted to be connected to each other upon continued axial movement of the first and second coupling members 105, 110 towards each other. Thus, the first and second coupling members 105, 110 are permitted to be connected to each other when their associated keyed members match or complement each other, due to the association of the first and second keyed members 205, 210 with the second and first coupling members 110, 105, respectively, and the complementary features of the first and second keyed members 205, 210. Conversely, the first and second coupling members 105, 110 will not be permitted to be connected to each other when their associated keyed members are not matching or complementary.

Although the first and second keyed members 205, 210 are associated with the second and first coupling members 110, 105, respectively, it will be appreciated that the associations may be reversed. For example, the first and second keyed members 205, 210 can be associated with the first and second coupling members 105, 110, respectively.

Figure 3:
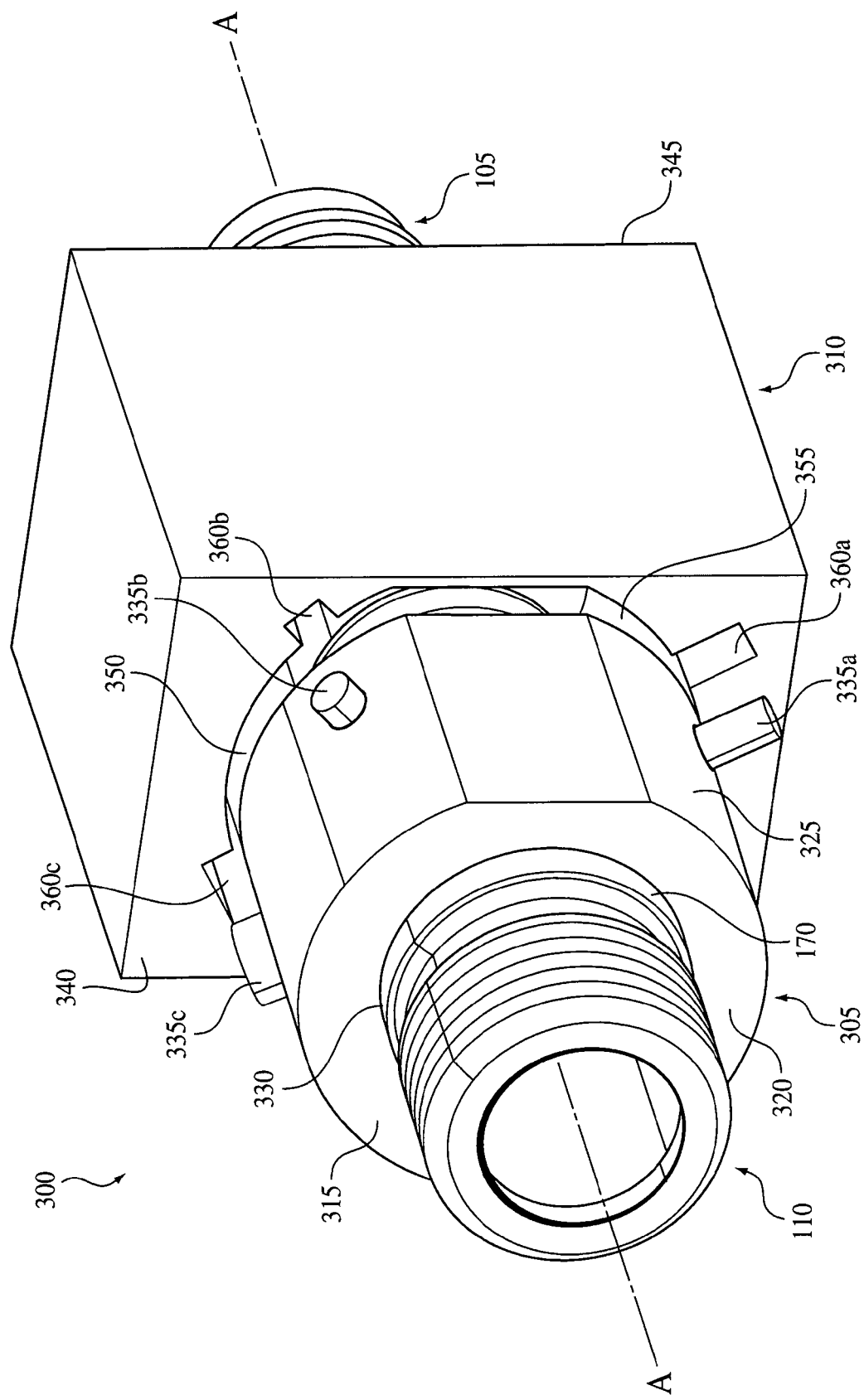
FIG. 3 illustrates a perspective view of another embodiment of a keyed coupling assembly 300 including the exemplary coupling 100.

Illustrated in FIG. 3 is a perspective view of another embodiment of a keyed coupling assembly 300 including the exemplary coupling 100 discussed above and illustrated in FIGS. 1A and 1B. In this embodiment, the keyed coupling assembly 300 includes a first keyed member 305 associated with the second coupling member 110 and a second keyed member 310 associated with the first coupling member 105, wherein the first and second keyed members 305, 310 are configured to mate with each other when they are properly aligned (rotationally) and axially moved towards each other.

With reference to FIG. 3, the first keyed member 305 includes a wall 315 that extends substantially perpendicular to the longitudinal axis A of the second coupling member 110 and defining an outer surface 320 (hereinafter "radial surface 320") and an inner surface (not shown) that is substantially parallel to the outer surface 320. The first keyed member 305 further includes an outer contoured surface 325 that extends substantially perpendicular from the wall 315 (hereinafter "axial surface 325") and an opening 330 extending through the wall 315. The opening 330 is coaxial with the second coupling member 110 and sized to slidably receive the first reduced diameter portion 170 of the second coupling member 110 until the inner surface (not shown) of the wall 315 of the first keyed member 305 seats against the shoulder 180 (not shown in FIG. 3) of the second coupling member 110.

The first keyed member 305 includes at least one male element that is configured to mate with at least one female element provided in or on the second keyed member 310, which will be described in further detail below, when such male and female elements are rotationally aligned (angularly oriented) with each other. In the illustrated embodiment, the first keyed member 305 includes three posts or pins 335a-c extending radially outward from the axial surface 325. In alternative embodiments (not shown), the first keyed member 305 can include two or less posts or four or more posts extending radially outward from the axial surface 325 depending on the desired design. Additionally, in alternative embodiments (not shown), one or more of the posts 335a-c can be replaced with a projection or protrusion that extends radially outward from the axial surface 325, such as a tongue or rib. The tongue or rib can have a profile taking the form a variety of shapes and can extend along a portion or the entire axial length of the axial surface 325. Moreover, in alternative embodiments (not shown), the first keyed member 305 can include at least one female-type feature or structure that is configured to mate with at least one male-type feature or structure provided in or on the second keyed member 310.

In the illustrated embodiment, the posts 335a-c are spaced-apart from each other and arranged in a predetermined pattern along the axial surface 325 of the first keyed member 305. In alternative embodiments (not shown), the posts 335a-c may be arranged in a different pattern along the axial surface 325 of the first keyed member 305.

As shown in FIG. 3, each post 335a-c is cylindrical in shape that has a circular cross-section when taken along a plane that is parallel to the axis A and a rectangular or square shaped cross-section when taken along a plane that is perpendicular to the axis A. In alternative embodiments (not shown), one or more of the posts 335a-c can have a different cross-sectional shape when taken along either plane.

In the illustrated embodiment, the three posts 335a-c have different diameters and lengths. Specifically, the first post 335a has the same diameter as the second post 335b, but the first post 335a has a greater length than the second post 335b. The third post 335c has the same length as the second post 335b, but a different diameter than both the first and second posts 335a,b. In alternative embodiments (not shown), the posts can all have the same length or can all have different lengths. Moreover, in alternative embodiments (not shown), the posts can all have the same diameter or can all have different diameters.

With continued reference to FIG. 3, the second keyed member 310 includes first and second opposing surfaces 340, 345 that extend in a direction substantially perpendicular to the longitudinal axis A of the coupling 100 (hereinafter "first radial surface 340" and second radial surface 345") and an opening 350 extending therebetween. The opening 350 is coaxial with the first coupling member 105 and includes a first portion 355 that is sized to receive the axial surface 325 of the first keyed member 305 and a second portion (not shown) that is rearward of the first portion 355 and sized to slidably receive the first reduced diameter portion 135 of the first coupling member 105.

As discussed above, the second keyed member 310 includes at least one female element that is configured to mate with at least one male element provided in or on the first keyed member 305, when such male and female elements are rotationally aligned (angularly oriented) with each other. In the illustrated embodiment, the first radial surface 340 of the second keyed member 310 includes three radially inward facing grooves or slots 360a-c that extend axially rearward from the first radial surface 340 and are sized to receive the posts 335a-c, respectively. The grooves 360a-c are spaced-apart from each other and arranged in substantially the same predetermined pattern as the posts 335a-c of the first keyed member 305. Additionally, the grooves 360a-c have a size (e.g., depth and width) and cross-sectional-shape that generally correspond to the size and shape of the posts 335a-c of the first keyed member 305. Moreover, in alternative embodiments (not shown), the second keyed member 310 can include at least one male-type feature or structure that is configured to mate with at least one female-type feature or structure provided in or on the first keyed member 305.

Although it is preferable that the grooves 355a-c generally correspond in size and shape to the posts 335a-c, it will be appreciated that the holes need only be sufficiently dimensioned to receive the posts and not necessarily have the same cross-sectional shape as the posts. For example, if a post is cylindrical shaped and has a rectangular or square cross-section when taken along a plane perpendicular to the axis A, it is preferable that the mating groove has a rectangular or square cross-section that is appropriately sized to receive the post. However, it is possible to provide a groove having a trapezoidal-shaped cross-section so long as the dimensions of the groove are capable of receiving the post.

Upon rotational alignment of the male elements (i.e., the posts 335a-c) to the female elements (i.e., the grooves 355a-c), the first and second keyed members 305, 310 are permitted to mate with each other and move in an axial direction towards each other. Once in a mating relationship with each other, the first and second coupling members 105, 110 are permitted to be connected to each other upon continued axial movement of the first and second coupling members 105, 110 towards each other. Thus, the first and second coupling members 105, 110 are permitted to be connected to each other when their associated keyed members match or complement each other, due to the association of the first and second keyed members 305, 310 with the second and first coupling members 110, 105, respectively, and the complementary features of the first and second keyed members 305, 310. Conversely, the first and second coupling members 105, 110 will not be permitted to be connected to each other when their associated keyed members are not matching or complementary.

Although the first and second keyed members 305, 310 are associated with the second and first coupling members 110, 105, respectively, it will be appreciated that the associations may be reversed. For example, the first and second keyed members 305, 310 can be associated with the first and second coupling members 105, 110, respectively.

Figure 4:
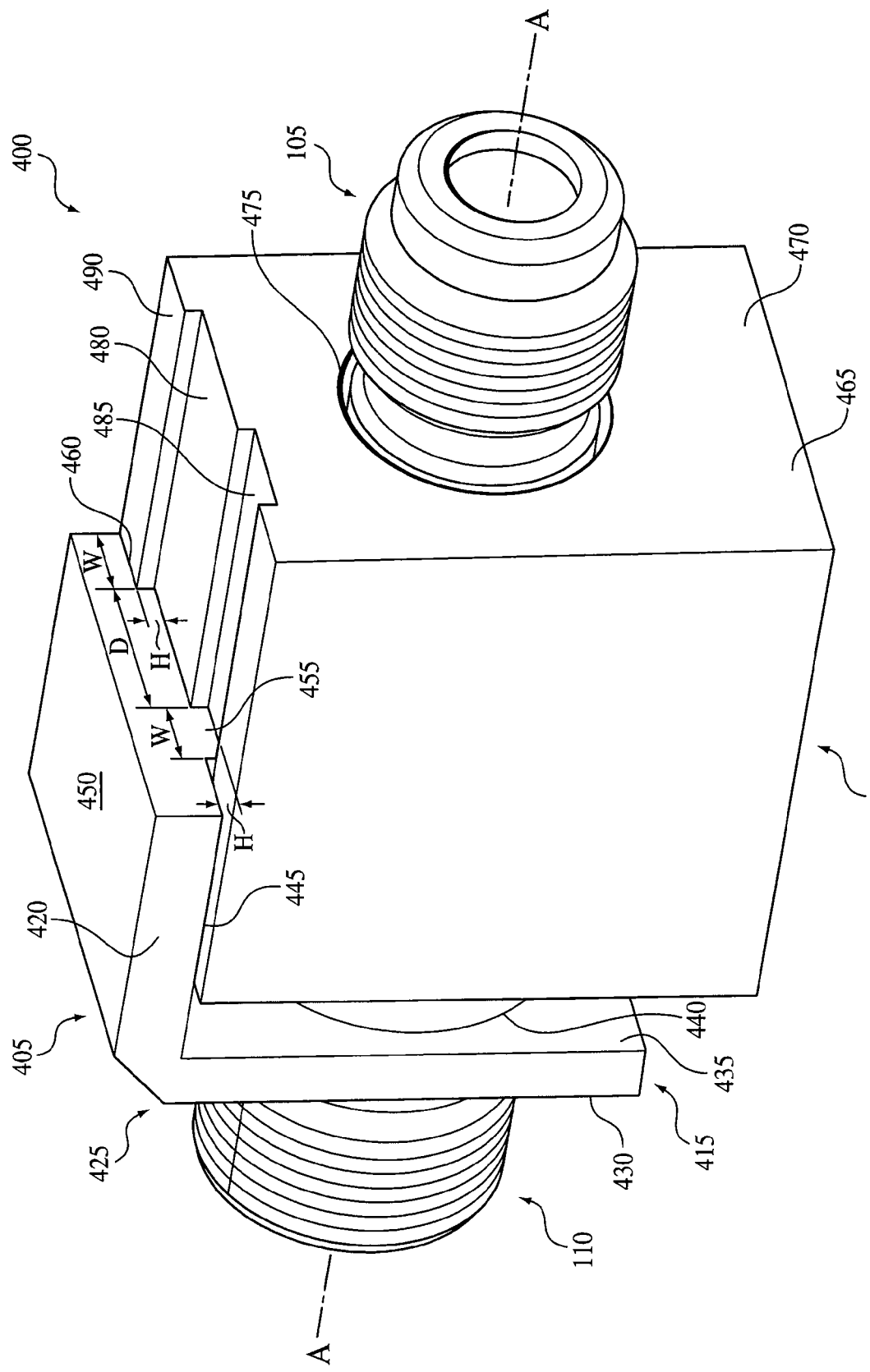
FIG. 4 illustrates a perspective view of another embodiment of a keyed coupling assembly 400 including the exemplary coupling 100.

Illustrated in FIG. 4 is a perspective view of another embodiment of a keyed coupling assembly 400 including the exemplary coupling 100 discussed above and illustrated in FIGS. 1A and 1B. In this embodiment, the keyed coupling assembly 400 includes a first keyed member 405 associated with the second coupling member 110 and a second keyed member 410 associated with the first coupling member 105, wherein the first and second keyed members 405, 410 are configured to mate with each other when they are properly aligned (rotationally) and axially moved towards each other.

With reference to FIG. 4, the first keyed member 405 includes a first portion 415 that is oriented substantially perpendicular to the longitudinal axis A of the coupling 100 and a second portion 420 extending substantially perpendicular from an edge 425 of the first portion 415. The first portion 415 has first and second opposing radial surfaces 430, 435 and an opening 440 extending therethrough. The opening 440 is coaxial with the second coupling member 110 and sized to receive the first reduced diameter portion 170 of the second coupling member 110 until the second radial surface 435 of the first keyed member 405 seats against the shoulder 180 (not shown in FIG. 4) of the second coupling member 110. The second portion 420 has opposing inner and outer axially extending surfaces 445, 450.

The second portion 420 of the first keyed member 405 includes at least one male element that is configured to mate with at least one female element provided in or on the second keyed member 410, which will be described in further detail below, when such male and female elements are rotationally aligned (angularly oriented) with each other. In the illustrated embodiment, the second portion 420 of the first keyed member 405 includes a protrusion or rib 455 that extends radially inward from and extends axially along the length of the inner surface 445. In alternative embodiments (not shown), the second portion 420 may include two or more ribs extending radially inward from the inner surface 445 depending on the desired design. Additionally, in another embodiment (not shown), the rib 455 may only extend along a portion of the length of the inner surface 445. In yet another embodiment (not shown), the rib 455 may be replaced with a pin or post (similar to the post discussed above) that extends radially inward from the inner surface 445.

The second portion 420 of the first keyed member 405 also includes at least one female element that is configured to mate with at least one male element provided in or on the second keyed member 410, which will be described in further detail below, when such male and female elements are rotationally aligned (angularly oriented) with each other. In the illustrated embodiment, the second portion 420 further includes a radially inward facing recessed strip 460 that extends radially outward from and axially along the length of the inner surface 445. The recessed strip 460 is spaced from the rib 455 a distance D and oriented substantially parallel thereto. In alternative embodiments (not shown), the second portion 420 can include two or more recessed strips extending radially outward from the inner surface 445 depending on the desired design.

The rib 455 and the recessed strip 460 may take the form of a variety of cross-sectional shapes. In the illustrated embodiment, the rib 455 and the recessed strip 460 both have rectangular cross-sections when taken along a plane perpendicular to the axis A. However, in alternative embodiments (not shown), the rib 455 and/or the recessed strip 460 can have a cross-section other than rectangular, such as T-shaped, semi-circular, triangular, square, trapezoidal, or another polygonal shape. As shown in FIG. 4, the rib 455 and the recessed strip 460 have a greater cross-sectional width W than height H. In alternative embodiments (not shown), the rib 455 and/or the recessed strip 460 can have a greater cross-sectional height H than width W.

With continued reference to FIG. 4, the second keyed member 410 includes a radial wall 465, which defines a first radial surface 470 and an opposing second radial surface (not shown) substantially parallel thereto, and an opening 475 extending through the radial wall 465. The opening 475 is coaxial with the first coupling member 105 and sized to receive the first reduced diameter portion 135 of the first coupling member 105 until the second radial surface (not shown) of the second keyed member 410 seats against the shoulder 145 (not shown in FIG. 4) of the first coupling member 105. The second keyed member 410 also includes a surface 480 that is oriented substantially perpendicular to the first radial surface 470 (hereinafter "axial surface 480").

As discussed above, the second keyed member 410 includes at least one female element and at least one male element that are configured to mate with at least one male element and at least one female element, respectively, provided in or on the first keyed member 405, when such male and female elements are rotationally aligned (angularly oriented) with each other. In the illustrated embodiment, the second keyed member 410 includes a radially outward facing groove or slot 485 extending radially inward from the axial surface 480 and a protrusion or rib 490 extending radially outward from the axial surface 480. The groove 485 and rib 490 extend axially along the length of the axial surface 480 and are configured to receive the rib 455 and the recessed strip 460, respectively, of the first keyed member 405. The groove 485 is spaced from the rib 490 the same distance D as the space between the tongue 455 and the recessed strip 460. Additionally, the groove 485 and the rib 490 of the second keyed member 410 have a size (e.g., height and width) and cross-sectional shape that generally corresponds to the size and shape of the rib 455 and the recessed strip 460 of the first keyed member 405.

Although it is preferable that the groove 485 and the recessed strip 460 generally correspond in size and shape to the ribs 455, 490, of the first and second keyed members 405, 410, respectively, it will be appreciated that the groove 485 and the recessed strip 460 need only be appropriately dimensioned to receive the ribs 455, 490, respectively, and not necessarily have the same cross-sectional shape as the ribs 455, 490, respectively. For example, if a rib has a rectangular cross-section when taken along a plane perpendicular to the axis A, it is preferable that the mating groove has a rectangular cross-section that is appropriately sized to receive the post. However, it is possible to provide a groove having a trapezoidal-shaped cross-section so long as the dimensions of the groove are capable of receiving the rib.

Upon rotational alignment of the male elements (i.e., the ribs 455, 490) to the female elements (i.e., the recessed strip 460 and the groove 490), the first and second keyed members 405, 410 are permitted to mate with each other and move in an axial direction towards each other. Once in a mating relationship with each other, the first and second coupling members 105, 110 are permitted to be connected to each other upon continued axial movement of the first and second coupling members 105, 110 towards each other. Thus, the first and second coupling members 105, 110 are permitted to be connected to each other when their associated keyed members match or complement each other, due to the association of the first and second keyed members 405, 410 with the second and first coupling members 110, 105, respectively, and the complementary features of the first and second keyed members 405, 410. Conversely, the first and second coupling members 105, 110 will not be permitted to be connected to each other when their associated keyed members are not matching or complementary.

Although the first and second keyed members 405, 410 are associated with the second and first coupling members 110, 105, respectively, it will be appreciated that the associations may be reversed. For example, the first and second keyed members 405, 410 can be associated with the first and second coupling members 105, 110, respectively.

Figure 5:
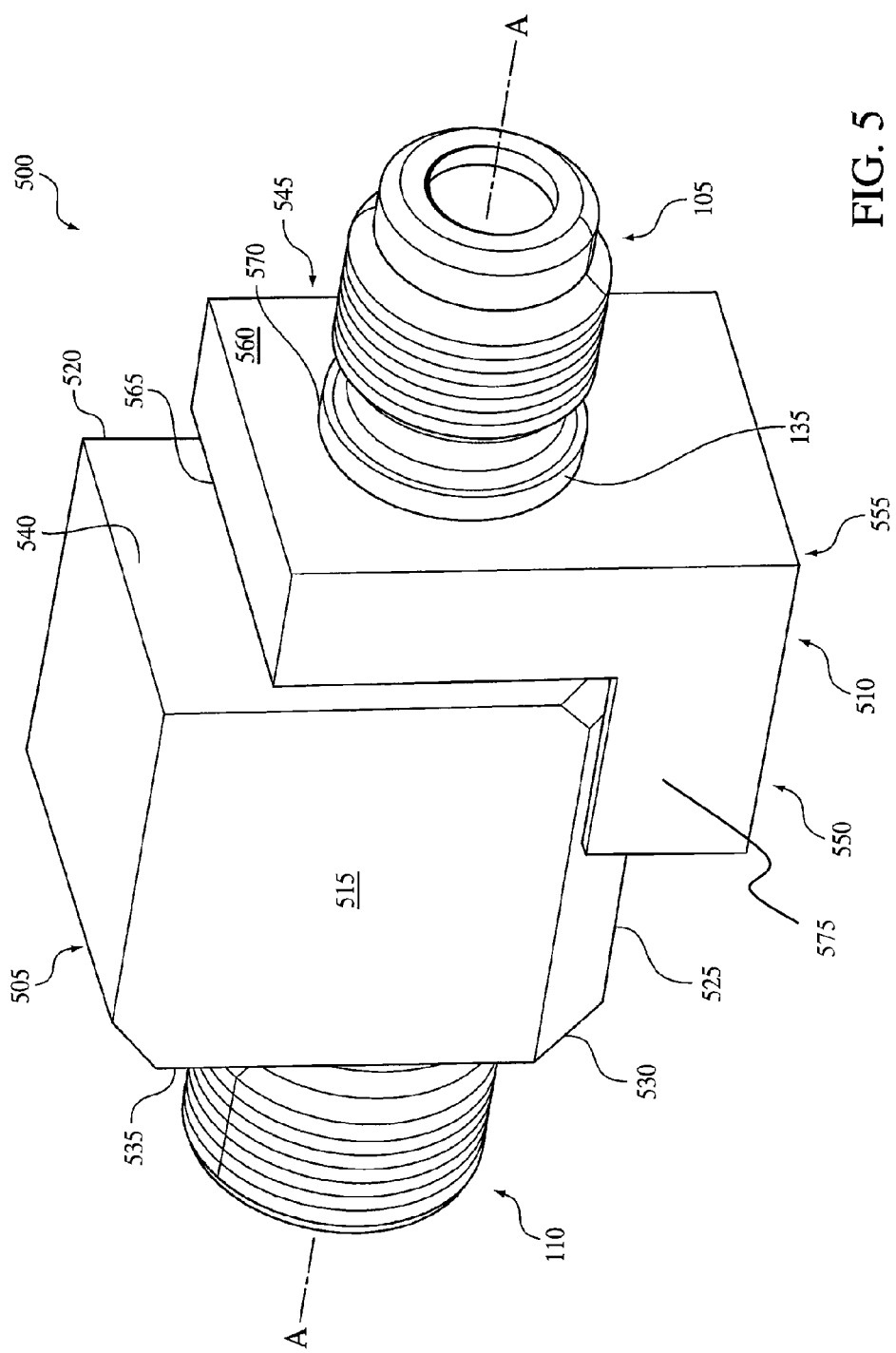
FIG. 5 illustrates a perspective view of another embodiment of a keyed coupling assembly 500 including the exemplary coupling 100.

Illustrated in FIG. 5 is a perspective view of another embodiment of a keyed coupling assembly 500 including the exemplary coupling 100 discussed above and illustrated in FIGS. 1A and 1B. In this embodiment, the keyed coupling assembly 500 includes a first keyed member 505 associated with the second coupling member 110 and a second keyed member 510 associated with the first coupling member 105, wherein the first and second keyed members 505, 510 are configured to mate with each other when they are properly aligned (rotationally) and axially moved towards each other.

With reference to FIG. 5, the first keyed member 505 includes first and second opposing surfaces 515, 520, a third surface 525 oriented substantially perpendicular to the first and seconds surfaces 515, 520, a first beveled surface 530 provided between the first surface 515 and the third surface 525, and a second beveled surface (not shown) provided between the second surface 520 and the third surface 525. In alternative embodiments (not shown), the first keyed member 505 can include less than two beveled surfaces or three or more beveled surfaces. Additionally, in alternative embodiment (not shown), one or both of the beveled surfaces could be replaced with radiused surfaces.

The first keyed member 505 further includes opposing first and second opposing radial walls 535, 540 and an opening (not shown) extending through the first and second radial walls 535, 540. The opening is coaxial with the second coupling member 110 and sized to slidably receive the first reduced diameter portion 170 of the second coupling member 110 until a second radial surface (not shown), which is defined by the first radial wall 535 of the first keyed member 505, seats against the shoulder 180 (not shown in FIG. 5) of the second coupling member 110.

The second keyed member 510 includes a first portion 545 that is oriented substantially perpendicular to the longitudinal axis A of the coupling 100 and a second portion 550 extending substantially perpendicular from an end portion 555 of the first portion 545. The first portion 545 has first and second opposing radial surfaces 560, 565 and an opening 570 extending therethrough. The opening 570 is coaxial with the first coupling member 105 and sized to receive the first reduced diameter portion 135 of the first coupling member 105 until the second radial surface 565 of the first portion 545 of the second keyed member 510 seats against the shoulder 145 (not shown in FIG. 5) of the first coupling member 105.

In the illustrated embodiment, the second portion 550 of the second keyed member 510 includes a receptacle (not shown) that is sufficiently dimensioned to mate with and receive the third surface 525, the first beveled surface 530, and the second beveled surface (not shown) of the first keyed member 505.

Upon rotational alignment, the first and second keyed members 505, 510 are permitted to mate with each other and move in an axial direction towards each other. Once in a mating relationship with each other, the first and second coupling members 105, 110 are permitted to be connected to each other upon continued axial movement of the first and second coupling members 105, 110 towards each other. Thus, the first and second coupling members 105, 110 are permitted to be connected to each other when their associated keyed members match or complement each other, due to the association of the first and second keyed members 505, 510 with the second and first coupling members 110, 105, respectively, and the complementary features of the first and second keyed members 505, 510. Conversely, the first and second coupling members 105, 110 will not be permitted to be connected to each other when their associated keyed members are not matching or complementary.

Although the first and second keyed members 505, 510 are associated with the second and first coupling members 110, 105, respectively, it will be appreciated that the associations may be reversed. For example, the first and second keyed members 505, 510 can be associated with the first and second coupling members 105, 110, respectively.

The keyed coupling assemblies 200, 300, 400, 500 discussed above, namely the respective first and second keyed members, can be constructed from a variety of materials. For example, the first and second keyed members can be constructed of a polymeric material. Other suitable materials include metal or ceramic.

As discussed above, the keyed members of each of the keyed coupling assemblies 200, 300, 400, 500 illustrated in the figures and described above are associated with respective first and second coupling members. By "associated," it is meant that the keyed members can be: (i) separate components that are installed onto respective first and second coupling members and capable of moving relative thereto after installation (like the embodiments describe above); (ii) separate components that are installed onto respective first and second coupling members and connected thereto (e.g., by welding, staking, press-fitting, etc.) preventing relative movement (rotational or axial) between the keyed components and their respective first and second coupling members; and (iii) made integral with the first and second coupling members during manufacturing thereof (e.g., via machining, molding, etc.).

Because the keyed members can be provided as separate components, they can be provided as a kit for use with any type of coupling. For example, the kit can include a pair of mating keyed members for later installation onto a pair of coupling members. Alternatively, the kit can include a single keyed member for installation onto a first coupling member and configured to mate with another keyed member already installed onto a second coupling member.

As discussed above, the keyed coupling assemblies 200, 300, 400, 500 discussed above can be used with any type of coupling, including one having male and female halves, and can be employed in a variety of applications. One exemplary application of the keyed coupling assemblies 200, 300, 400, 500 discussed above is a communication or navigation device that utilizes liquid cooling to cool a preprogrammed card installed therein.

Figure 6A:
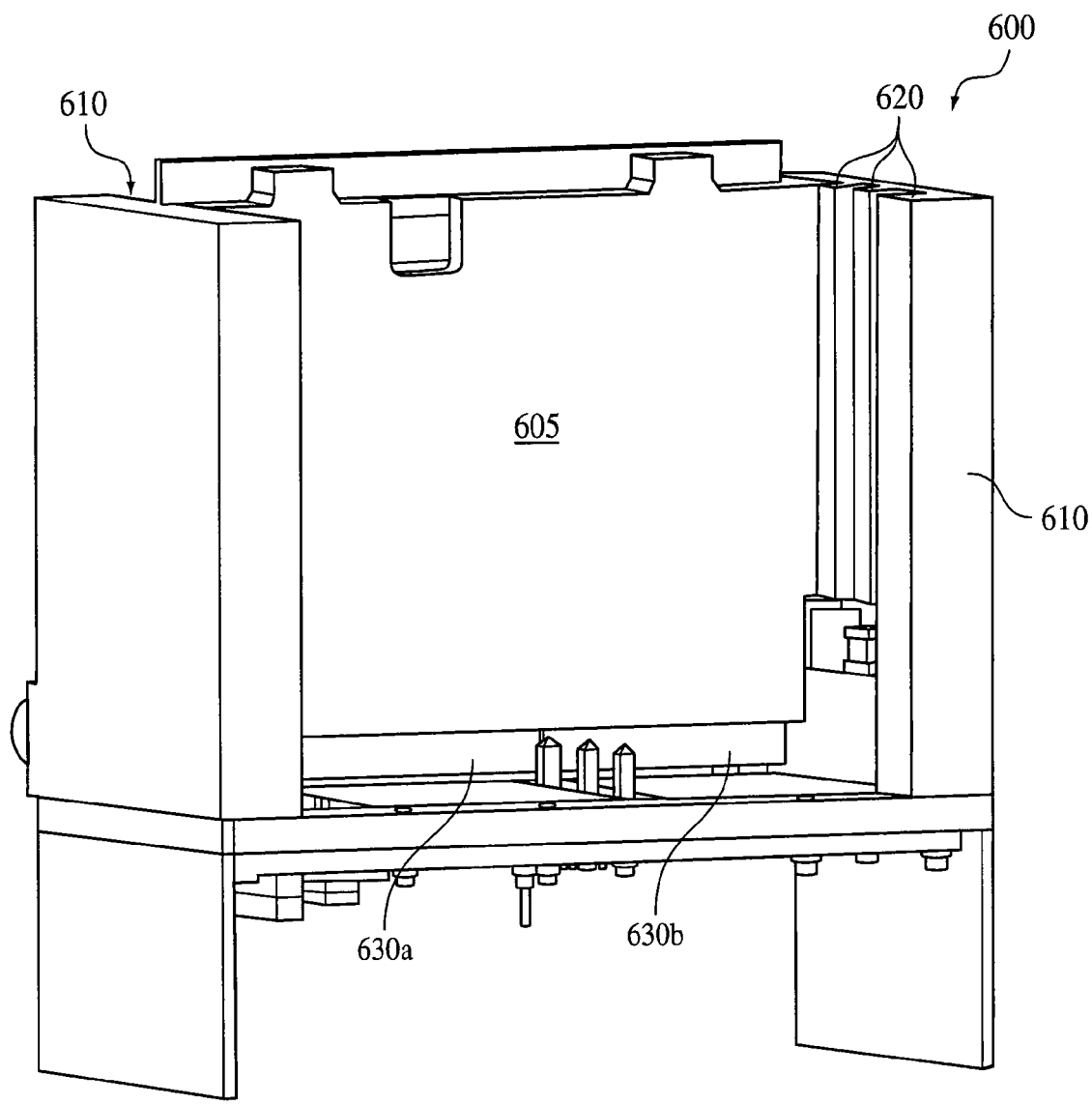
FIG. 6A illustrates a perspective view of a programmable communication or navigation device 600, which is one exemplary application of the keyed coupling assembly 400.

Illustrated in FIG. 6A is a perspective view of one embodiment of a communication or navigation device 600 that includes a preprogrammed communication or navigation card 605 detachably secured in a card rack 610. The card 605 is precisely positioned within the card rack 610 having its opposed side edges engaged in opposed tracks 620 of the card rack 610, and by having its rear edge engaged by opposed latching devices (not shown), which precisely position the card 605 in a front to back direction. In the position shown in FIG. 6A, first and second electrical connectors 630a,b mounted on the card 605 electrically engage first and second electrical connectors (not shown) mounted on a printed circuit board in the device 600.

Figure 6B:
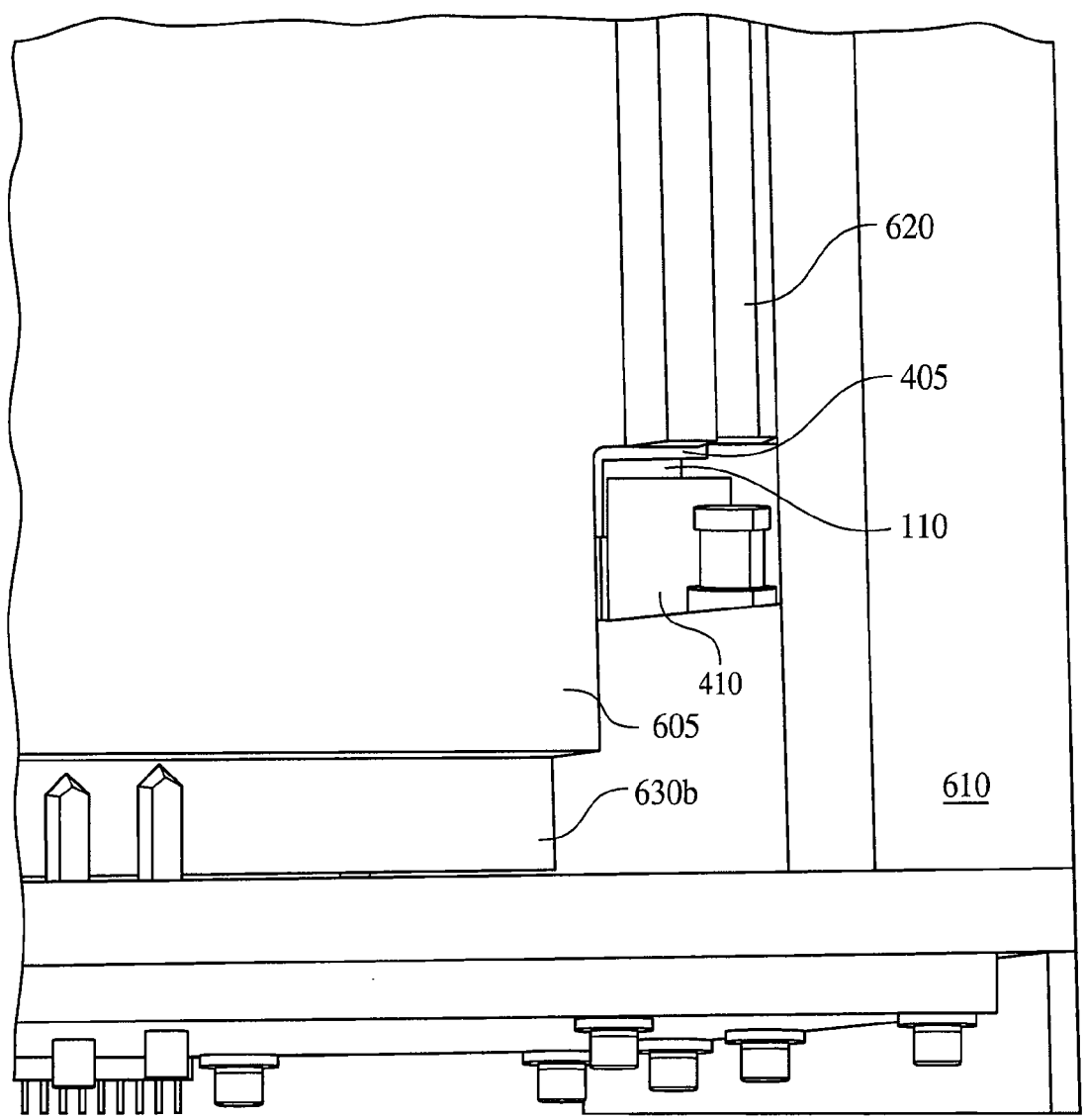
FIG. 6B illustrates a fragmentary view of a portion of the device 600.
Figure 6C:
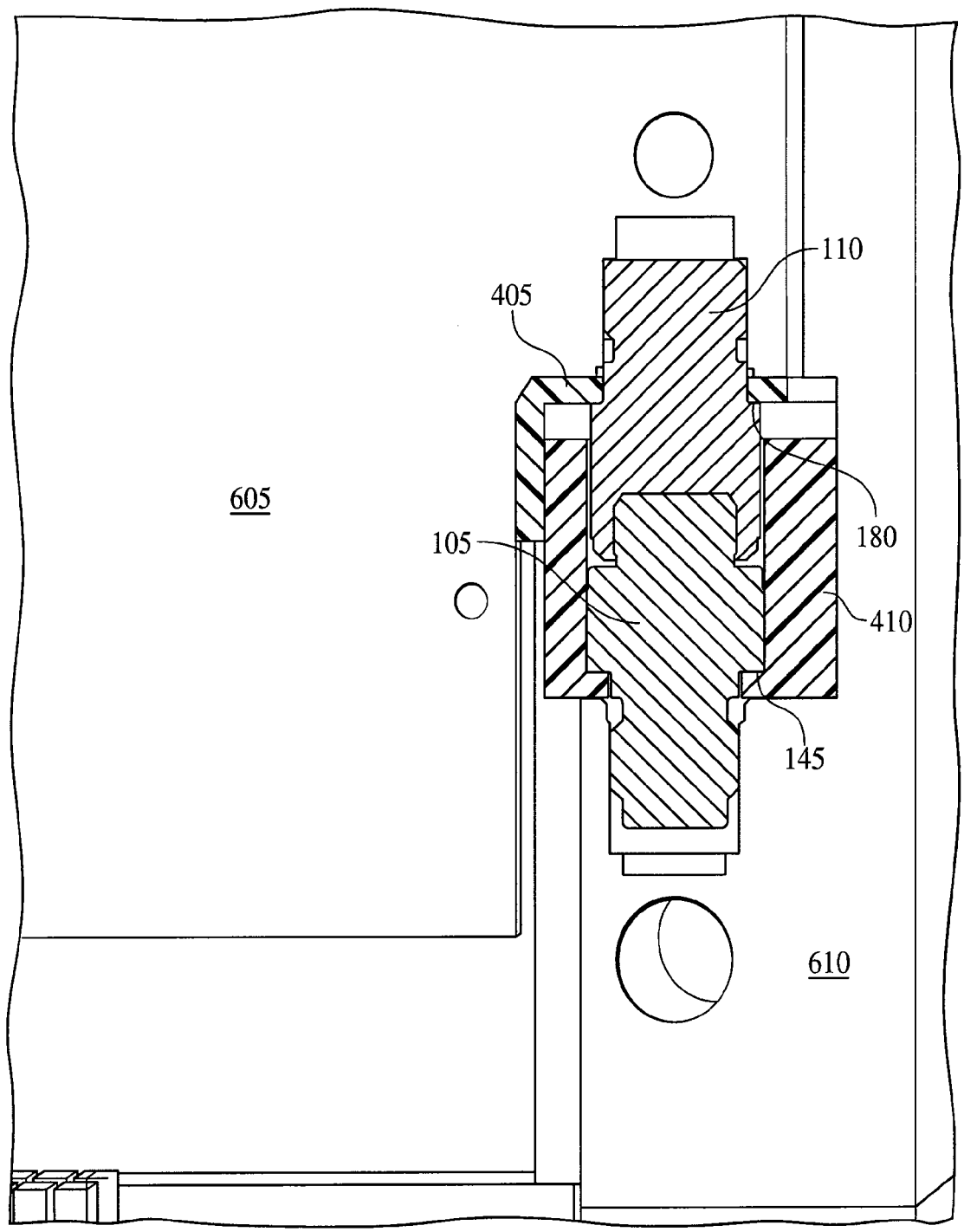
FIG. 6C illustrates a cross-sectional view of a portion of the device 600.

With reference to FIGS. 6B and 6C, the card 605 is internally liquid cooled, by means not shown, and includes a male coupling member (similar to the second coupling member 110 discussed above and illustrated in FIGS. 1A and 1B) (hereinafter "second coupling member 110"). The second coupling member 110 is disengageably connected with a mating female coupling member (similar to the first coupling member 105 discussed above and illustrated in FIGS. 1A and 1B) (hereinafter "first coupling member 105"), which is mounted to the card rack 610. The second coupling member 110 and the first coupling member 105, once engaged, permit a cooling liquid to be circulated through the card 605 to ensure proper cooling of the card 605. Together, the second and first coupling members 110, 105 provide a quick disconnect coupling, which reduces the time involved in replacing the card 605 with a similar, but somewhat differently, preprogrammed card.

To ensure that the card 605 is installed in the correct track 620 in the card rack 610, the device 600 includes the keyed coupling assembly 400 discussed above and illustrated in FIG. 4. As shown in FIGS. 6B and 6C, the first keyed member 405 is positioned between the second coupling member 110 and the card 605 and secured thereto when the second coupling member 110 is threaded into the rack 610. The shoulder 180 on the second coupling member 110 holds the first keyed member 405 in place. Based on the geometry of the card 600 to which it is being installed, the first keyed member 405 is self-aligned during installation.

With continued reference to FIGS. 6B and 6C, the second keyed member 410 is positioned between the first coupling member 105 and the card rack 610 and secured thereto when the first coupling member 105 is threaded into the card rack 610. The shoulder 145 on the first coupling member 105 holds the second keyed member 410 in place. Based on the geometry of the card rack 610 to which it is being installed, the second keyed member 410 is self-aligned during installation.

Although the geometry of the card 605 and the card rack 610 dictate the position of the first and second members 405, 410, respectively, and cause them to self align, it will be appreciated that other types of alignment means may be provided on the card and/or the card rack to ensure that the first and second keyed members are properly aligned (i.e., rotational orientation) during installation to their respective components.

By providing the matching first and second key members 405, 410 on the second and first coupling members 110, 105, respectively, an installer or service technician can be assured that he/she is installing the correct card into the appropriate track. If the installer or service technician attempts to install a card having a key member that does not match with the key member provided on the coupling member mounted in the card rack, the non-matching keyed members will not mate with each other, thereby preventing the card from being installed in the card rack.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or multiple components.

While the present application illustrates various embodiments, and while these embodiments have been described in some detail, it is not the intention of the applicant to restrict or in any way limit the scope of the claimed invention to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's claimed invention.

What is claimed is:

1. A keyed coupling assembly comprising:
   a male coupling member;
   a female coupling member which receives the male coupling member;
   a first keyed member having at least one radially inward extending male element and at least one inwardly facing female element, the first keyed member further having an opening which receives the female coupling member; and
   a second keyed member having at least one radially outward facing female element which receives the male element of the first keyed member and at least one outwardly extending male element which is received by the female element of the first keyed member, the second keyed member further having an opening which receives the male coupling member, wherein the second keyed member mates with the first keyed member when the first and second keyed members are rotationally aligned with each other,
   wherein, upon rotational alignment of the male and female elements of the first and second keyed members and subsequent axial movement of the male coupling member towards the female coupling member without further relative rotation between the first keyed member and the second keyed member, the first keyed member mates with the second keyed member, thereby permitting the female coupling member to receive the male coupling member upon further axial movement of the male coupling member towards the female coupling member without relative rotation between the male coupling member and the female coupling member.

2. The keyed coupling assembly of claim 1, wherein the first keyed member includes at least one radially outward extending rib and the second keyed member includes at least one radially inward extending groove configured to receive the rib of the first keyed member.

3. The keyed coupling assembly of claim 1, wherein the at least one radially inward extending male element of the first keyed member includes at least one radially inward extending rib, and wherein the at least one radially outward facing female element of the second keyed member includes at least one radially outward facing and axially extending groove configured to receive the rib of the first keyed member.

4. The keyed coupling assembly of claim 3, wherein the at least one outwardly extending male element of the second keyed member includes at least one radially outward extending rib, and wherein the at least one inwardly facing female element of the first keyed member includes at least one radially inward facing and axially extending groove configured to receive the rib of the second keyed member.

5. The keyed coupling assembly of claim 1, wherein the opening of the first keyed member slidably receives the female coupling member.

6. The keyed coupling assembly of claim 1, wherein the opening of the second keyed member slidably receives the male coupling member.

7. A keyed coupling kit comprising:
   a female coupling member;
   a male coupling member received by the female coupling member;
   a first keyed member having an opening which receives the female coupling member, and further having at least one radially inward extending male element; and
   a second keyed member having an opening which receives the male coupling member, and further having at least one radially outward facing female element which receives the male element of the first keyed member;
   wherein the second keyed member mates with the first keyed member when the first and second keyed members are rotationally aligned with each other, wherein the at least one radially inward extending male element of the first keyed member includes at least one radially inward extending rib and the at least one radially outward facing female element of the second keyed member includes at least one radially outward facing groove configured to receive the rib of the first keyed member,
   wherein, upon installation of the first and second keyed members onto the female and male coupling members, respectively, rotational alignment of the male and female elements of the first and second keyed members, and subsequent axial movement of the female coupling member towards the male coupling member without relative rotation between the female coupling member and the male coupling member and without further relative rotation between the first keyed member and the second keyed member, the first keyed member mates with the second keyed member, thereby permitting the female coupling member to receive the male coupling member upon further axial movement of the female coupling member towards the male coupling member without relative rotation between the female coupling member and the male coupling member and without relative rotation between the first keyed member and the second keyed member, and wherein the second keyed member further includes at least one radially outward extending rib and the first keyed member further includes at least one radially inward facing groove configured to receive the rib of the second keyed member.

8. The keyed coupling kit of claim 7, wherein the opening of the first keyed member slidably receives the female coupling member.

9. The keyed coupling kit of claim 7, wherein the opening of the second keyed member slidably receives the male coupling member.

\* \* \* \* \*